(12) United States Patent
Yang et al.

(10) Patent No.: US 11,233,685 B2
(45) Date of Patent: Jan. 25, 2022

(54) ORTHOGONAL COVER CODE (OCC) SEQUENCES DESIGN FOR UPLINK TRANSMISSIONS

(71) Applicant: QUALCOMM Incorporated, San Diego, CA (US)

(72) Inventors: Wei Yang, San Diego, CA (US); Yi Huang, San Diego, CA (US); Xiao Feng Wang, San Diego, CA (US); Seyong Park, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 16/243,722

(22) Filed: Jan. 9, 2019

(65) Prior Publication Data
US 2019/0222451 A1 Jul. 18, 2019

Related U.S. Application Data

(60) Provisional application No. 62/616,881, filed on Jan. 12, 2018.

(51) Int. Cl.
*H04L 27/26* (2006.01)
*H04L 5/00* (2006.01)
(Continued)

(52) U.S. Cl.
CPC ........ *H04L 27/2614* (2013.01); *H04L 1/0003* (2013.01); *H04L 5/0053* (2013.01);
(Continued)

(58) Field of Classification Search
CPC . H04L 27/2614; H04L 1/0003; H04L 5/0053; H04L 27/2613; H04L 27/2615;
(Continued)

(56) References Cited

U.S. PATENT DOCUMENTS

| 7,586,836 B2 * | 9/2009 | Park | H04L 27/2613 370/209 |
| 7,961,696 B2 * | 6/2011 | Ma | H04L 27/2655 370/344 |

(Continued)

OTHER PUBLICATIONS

Interdigital et al: "On pi/2 BPSK Modulation for Long PUCCH," 3GPP Draft; R1-1720639 On PI-2 BPSK Modulation for Long PUCCH, 3rd Generation Partnership Project (3GPP), Mobile Competence Centre; 650, Route Des Lucioles; F-06921 Sophia-Antipolis Cedex; France, vol. RAN WG1, No. Reno; Nov. 27, 2017-Dec. 1, 2017, Nov. 18, 2017, XP051370103, 6 pages, Retrieved from the Internet: URL: http://www.3gpp.org/ftp/tsg%5Fran/WG1% 5FRL1/TSGR1%5F91/Docs/ [retrieved on Nov. 18, 2017] paragraph [0002]—paragraph [0003].

(Continued)

*Primary Examiner* — Huy D Vu
*Assistant Examiner* — Bailor C. Hsu
(74) *Attorney, Agent, or Firm* — Patterson + Sheridan, L.L.P.

(57) ABSTRACT

The present disclosure relates generally to wireless communication systems, and more particularly, to a design for generating and utilizing orthogonal cover code (OCC) sequences for physical uplink control channel (PUCCH) transmissions. An exemplary method includes a user equipment (UE) selecting an orthogonal cover code (OCC) sequence for an uplink transmission, wherein the OCC sequence is selected from a first set of OCC sequences designed to achieve target peak to average power ratios (PAPRs) for a plurality of different modulation schemes; and transmitting the uplink transmission, via a wireless medium, with one of the modulation schemes using the selected OCC sequence.

27 Claims, 14 Drawing Sheets

(51) Int. Cl.
  *H04L 1/00* (2006.01)
  *H04W 72/04* (2009.01)

(52) U.S. Cl.
  CPC ...... *H04L 27/2613* (2013.01); *H04L 27/2615* (2013.01); *H04L 27/2628* (2013.01); *H04L 27/2643* (2013.01); *H04W 72/0413* (2013.01); H04L 5/0007 (2013.01)

(58) Field of Classification Search
  CPC ............. H04L 27/2628; H04L 27/2643; H04L 5/0007; H04W 72/0413
  See application file for complete search history.

(56) References Cited

U.S. PATENT DOCUMENTS

| | | | | |
|---|---|---|---|---|
| 8,553,671 | B2* | 10/2013 | Kim | H04J 13/16 |
| | | | | 370/344 |
| 9,628,231 | B2* | 4/2017 | Shattil | H04J 13/0003 |
| 2009/0046646 | A1* | 2/2009 | Cho | H04L 5/0055 |
| | | | | 370/329 |
| 2011/0228818 | A1* | 9/2011 | Hirama | H04B 1/707 |
| | | | | 375/146 |
| 2012/0020326 | A1* | 1/2012 | Zhang | H04W 36/18 |
| | | | | 370/331 |
| 2012/0063400 | A1* | 3/2012 | Papasakellariou | H04L 1/1861 |
| | | | | 370/329 |
| 2012/0140716 | A1* | 6/2012 | Baldemair | H04J 11/005 |
| | | | | 370/329 |
| 2012/0213187 | A1* | 8/2012 | Yang | H04W 72/0413 |
| | | | | 370/329 |
| 2012/0320859 | A1* | 12/2012 | Ahn | H04L 1/1861 |
| | | | | 370/329 |
| 2014/0098689 | A1* | 4/2014 | Lee | H04B 7/0469 |
| | | | | 370/252 |
| 2016/0254889 | A1* | 9/2016 | Shattil | H04J 13/004 |
| | | | | 370/329 |
| 2017/0019882 | A1* | 1/2017 | Nimbalker | H04W 72/042 |
| 2018/0262295 | A1* | 9/2018 | Oketani | H04L 27/2602 |

OTHER PUBLICATIONS

International Search Report and Written Opinion—PCT/US2019/013091—ISA/EPO—dated Apr. 11, 2019.

Qualcomm Incorporated: "Long PUCCH Design with more than 2 bits UCI Payload," 3GPP Draft; R1-1718563 Long PUCCH Design With More Than 2 Bits UCI Payload, 3rd Generation Partnership Project (3GPP), Mobile Competence Centre; 650, Route Des Lucioles; F-06921 Sophia-Antipolis Cedex, vol. RAN WG1, No. Prague, Czech Republic; Oct. 9-13, 2017, Oct. 3, 2017, XP051353130, 10 pages, Retrieved from the Internet: URL: http://www.3gpp.org/ftp/tsg_ran/WG1_RL1/TSGR1_90b/Docs/ [retrieved on Oct. 3, 2017] p. 3-p. 4.

Qualcomm Incorporated: "Long PUCCH Design with more than 2 bits UCI Payload," 3GPP Draft; R1-1721386 Long PUCCH Design With More Than 2 Bits UCI Payload, 3rd Generation Partnership Project (3GPP), Mobile Competence Centre; 650, Route Des Lucioles; F-06921 Sophia-Antipolis Cedex, vol. RAN WG1, No. Reno, USA; Nov. 27, 2017-Dec. 1, 2017, Nov. 27, 2017, XP051363830, 16 pages, Retrieved from the Internet: URL: http://www.3gpp.org/ftp/Meetings%5F3GPP%5FSYNC/RAN1/Docs/ [retrieved on Nov. 27, 2017].

* cited by examiner

| Index | $w_n, n = 0, \ldots, 11$ |
|---|---|
| 0 | [+1, +1, +1, +1, +1, +1, +1, +1, +1, +1, +1, +1] |
| 1 | [+1, +1, +1, -j, -j, -j, -1, -1, -1, +j, +j, +j] |
| 2 | [+1, +1, +1, -1, -1, -1, +1, +1, +1, -1, -1, -1] |
| 3 | [+1, +1, +1, +j, +j, +j, -1, -1, -1, -j, -j, -j] |

FIG. 8

ORTHOGONAL COVER CODE (OCC) SEQUENCES DESIGN FOR UPLINK TRANSMISSIONS

CROSS-REFERENCE TO RELATED APPLICATIONS

The present application for patent claims benefit of and priority to U.S. Provisional Patent Application No. 62/616,881, filed Jan. 12, 2018, which is assigned to the assignee hereof and hereby expressly incorporated by reference herein in its entirety as if fully set forth below and for all applicable purposes.

FIELD

The present disclosure relates generally to wireless communication systems, and more particularly, to a design for generating and utilizing orthogonal cover codes (OCCs) for uplink transmissions, especially physical uplink control channel (PUCCH) transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or $5^{th}$ generation (5G) network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a user equipment (UE). The method generally includes selecting an orthogonal cover code (OCC) sequence for an uplink transmission, wherein the OCC sequence is selected from a first set of OCC sequences designed to achieve target peak to average power ratios (PAPRs) for a plurality of different modulation schemes, and transmitting the uplink transmission with one of the modulation schemes using the selected OCC sequence.

Certain aspects of the present disclosure provide a method for wireless communications by a base station (BS). The method generally includes receiving a first uplink transmission from a first user equipment (UE) on a resource block (RB), wherein the first uplink transmission is generated based on a first orthogonal cover code (OCC) sequence from a first set of OCC sequences designed to achieve target peak to average power ratios (PAPRs) for a plurality of different modulation schemes, determining the first OCC sequence for the first uplink transmission from the first set of OCC sequences, and decoding first data contained in the first uplink transmission based on the determined first OCC sequence.

Certain aspects of the present disclosure provide an apparatus for wireless communications. The apparatus generally includes a processor configured to select an orthogonal cover code (OCC) sequence for an uplink transmission, wherein the OCC sequence is selected from a first set of OCC sequences designed to achieve target peak to average power ratios (PAPRs) for a plurality of different modulation schemes, and to transmit the uplink transmission with one of the modulation schemes using the selected OCC sequence.

Certain aspects of the present disclosure provide an apparatus for wireless communications. The apparatus generally includes a processor configured to receive a first uplink transmission from a first user equipment (UE) on a resource block (RB), wherein the first uplink transmission is generated based on a first orthogonal cover code (OCC) sequence from a first set of OCC sequences designed to achieve target peak to average power ratios (PAPRs) for a plurality of different modulation schemes, to determine the first OCC sequence for the first uplink transmission from the first set of OCC sequences, and to decode first data contained in the first uplink transmission based on the determined first OCC sequence.

Certain aspects of the present disclosure provide an apparatus for wireless communications. The apparatus generally includes means for selecting an orthogonal cover code (OCC) sequence for an uplink transmission, wherein the OCC sequence is selected from a first set of OCC sequences designed to achieve target peak to average power ratios (PAPRs) for a plurality of different modulation schemes, and means for transmitting the uplink transmission with one of the modulation schemes using the selected OCC sequence.

Certain aspects of the present disclosure provide an apparatus for wireless communications. The apparatus generally includes means for receiving a first uplink transmission from a first user equipment (UE) on a resource block (RB), wherein the first uplink transmission is generated based on a first orthogonal cover code (OCC) sequence from a first set of OCC sequences designed to achieve target peak to average power ratios (PAPRs) for a plurality of different modulation schemes, means for determining the first OCC sequence for the first uplink transmission from the first set of OCC sequences, and means for decoding first data contained in the first uplink transmission based on the determined first OCC sequence.

Certain aspects of the present disclosure provide a computer-readable medium. The computer-readable medium includes instructions that, when executed by a processor, cause the processor to perform operations generally including selecting an orthogonal cover code (OCC) sequence for an uplink transmission, wherein the OCC sequence is selected from a first set of OCC sequences designed to achieve target peak to average power ratios (PAPRs) for a plurality of different modulation schemes, and transmitting the uplink transmission with one of the modulation schemes using the selected OCC sequence.

Certain aspects of the present disclosure provide a computer-readable medium. The computer-readable medium includes instructions that, when executed by a processor, cause the processor to perform operations generally including receiving a first uplink transmission from a first user equipment (UE) on a resource block (RB), wherein the first uplink transmission is generated based on a first orthogonal cover code (OCC) sequence from a first set of OCC sequences designed to achieve target peak to average power ratios (PAPRs) for a plurality of different modulation schemes, determining the first OCC sequence for the first uplink transmission from the first set of OCC sequences, and decoding first data contained in the first uplink transmission based on the determined first OCC sequence.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 8 illustrates example orthogonal cover code (OCC) sequences.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
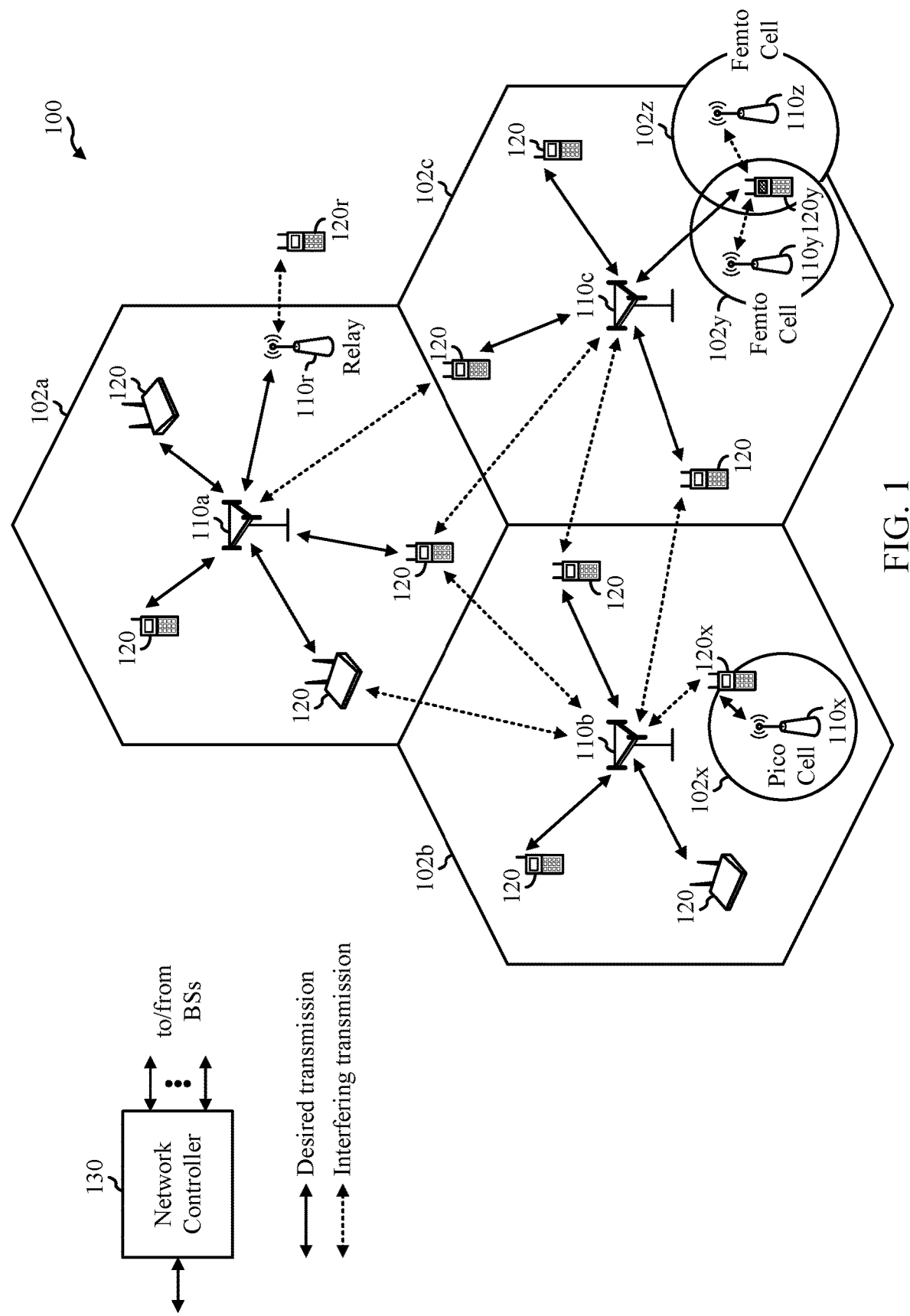
FIG. 1 is a block diagram conceptually illustrating an example telecommunications system, in accordance with certain aspects of the present disclosure.

NR may support various wireless communication services, such as Enhanced mobile broadband (eMBB) services targeting wide bandwidth (e.g., 80 MHz and wider) techniques, millimeter wave (mmW) services targeting high carrier frequency (e.g., 27 GHz and higher) techniques, massive machine-type communications (mMTC) services targeting non-backward compatible machine-type communications (MTC) techniques, and/or mission critical services targeting ultra-reliable low latency communications (URLLC) techniques. These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

EXAMPLE WIRELESS COMMUNICATIONS SYSTEM

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a healthcare device, a medical device, a wearable device such as a smart watch, smart clothing, smart glasses, virtual reality goggles, a smart wrist band, smart jewelry (e.g., a smart ring, a smart bracelet, etc.), an entertainment device (e.g., a music device, a gaming device, a video device, a satellite radio, etc.), a vehicular component or sensor, a smart meter/sensor, industrial manufacturing equipment, a positioning device (e.g., GPS, Beidou, GLONASS, Galileo, terrestrial-based), or any other suitable device that is configured to communicate via a wireless or wired medium. Some UEs may be considered machine-type communication (MTC) devices or enhanced or evolved MTC (eMTC) devices. MTC may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Some UEs may be considered Internet of Things devices. The Internet of Things (IoT) is a network of physical objects or "things" embedded with, e.g., electronics, software, sensors, and network connectivity, which enable these objects to collect and exchange data. The Internet of Things allows objects to be sensed and controlled remotely across existing network infrastructure, creating opportunities for more direct integration between the physical world and computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each "thing" is generally uniquely identifiable through its embedded computing system but is able to interoperate within the existing Internet infrastructure. Narrowband IoT (NB-IoT) is a technology being standardized by the 3GPP standards body. This technology is a narrowband radio technology specially designed for the IoT, hence its name. Special focuses of this standard are on indoor coverage, low cost, long battery life and large number of devices. MTC/eMTC and/or IoT UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth (e.g., system frequency band) into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
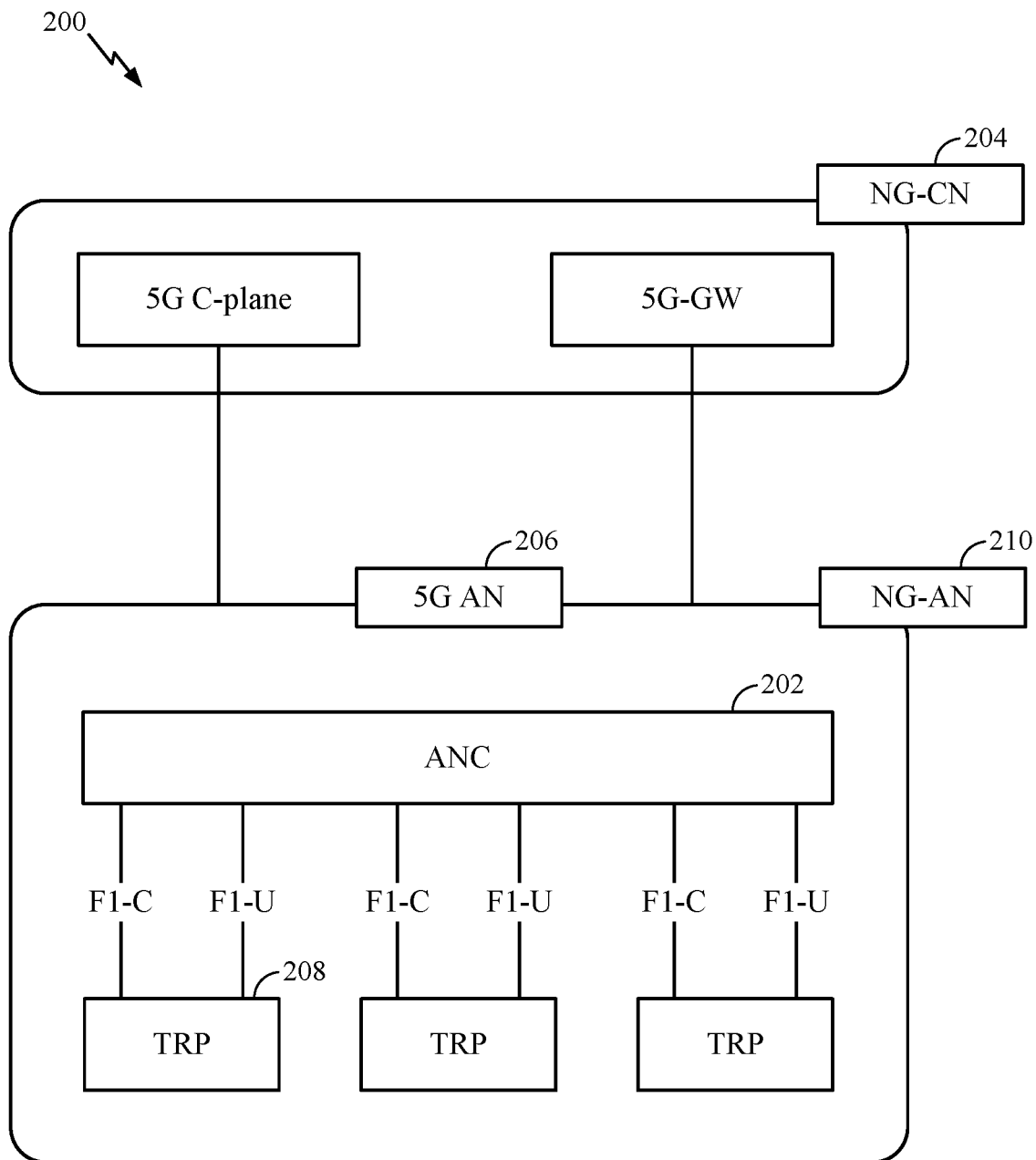
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
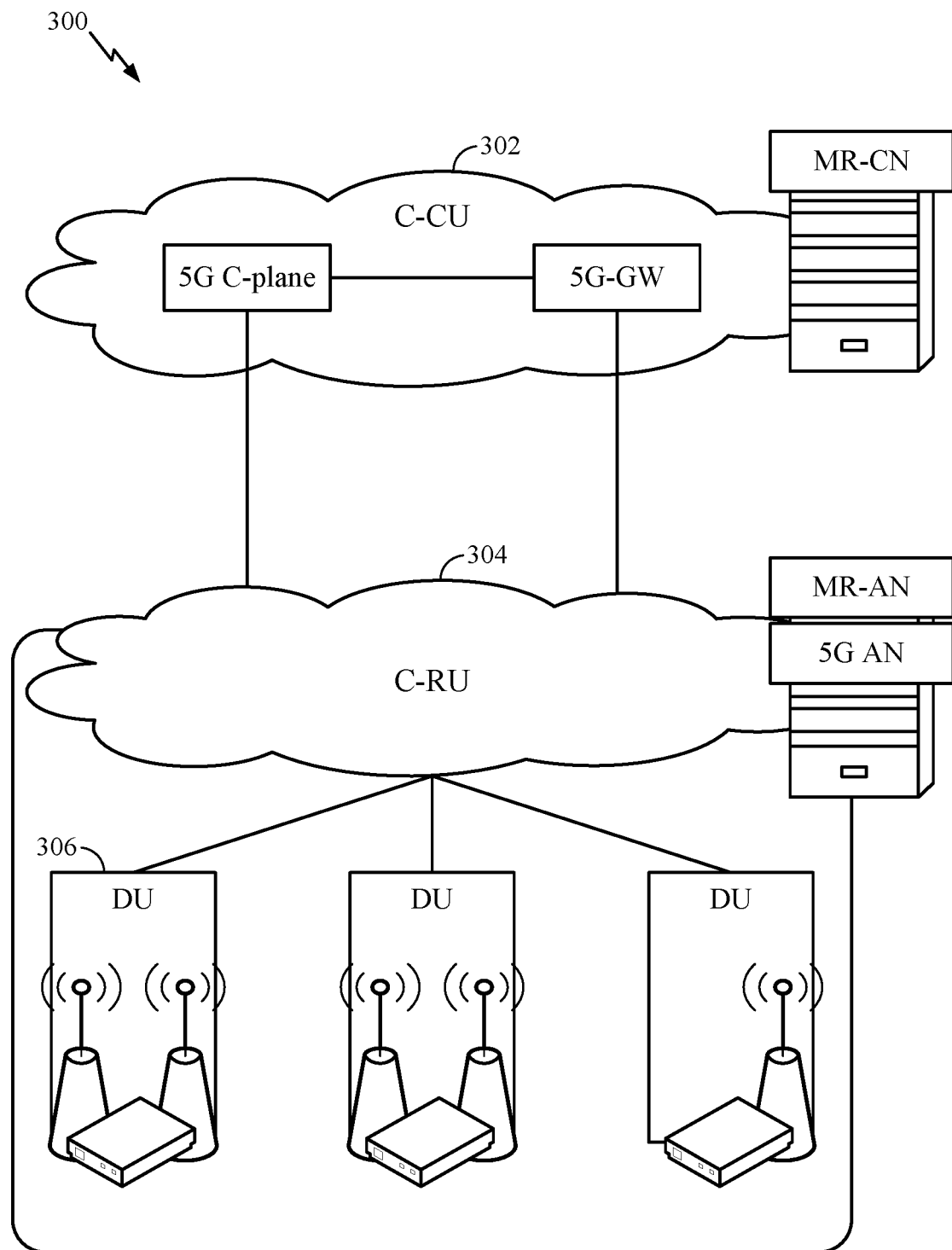
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
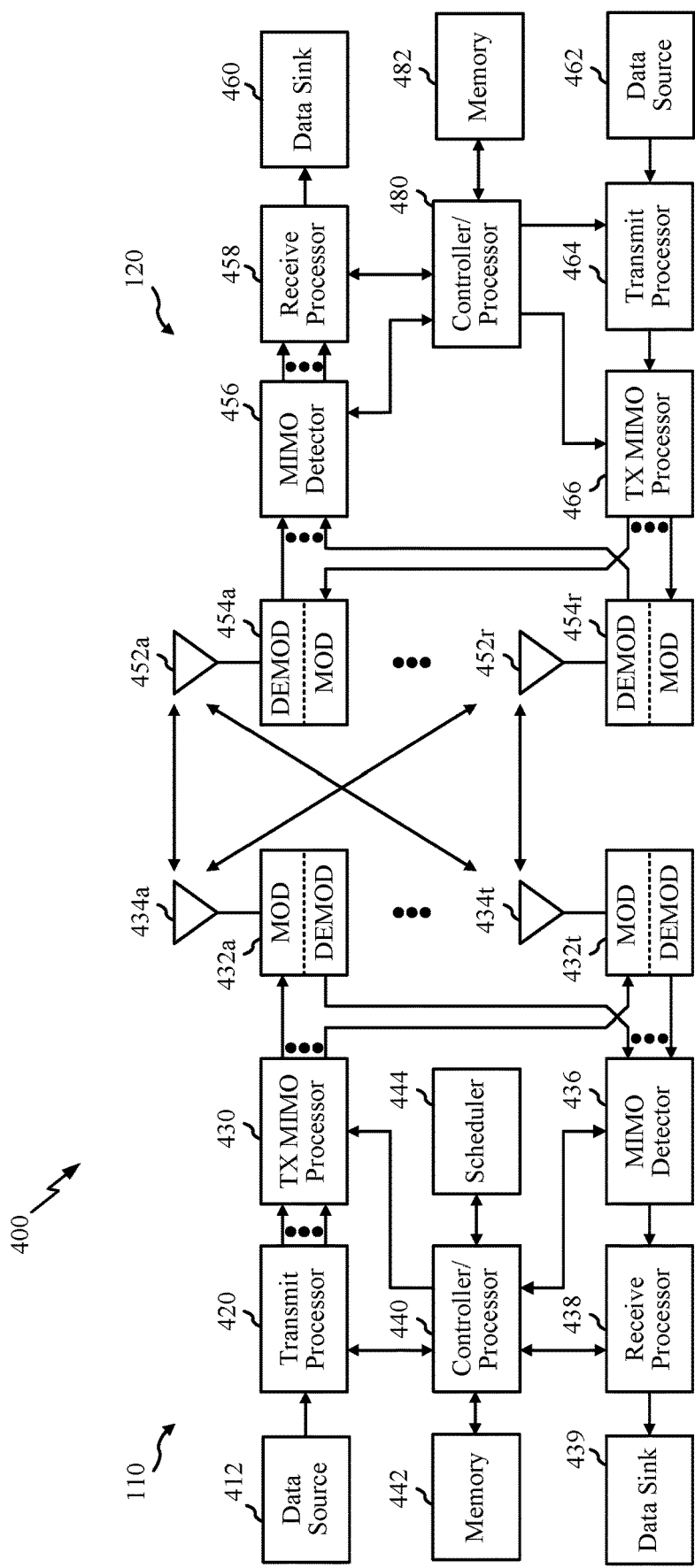
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the processes for the techniques described herein. The processor 480 and/or other processors and modules at the UE 120 may also perform or direct, e.g., execution of the functional blocks illustrated in FIG. 10, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
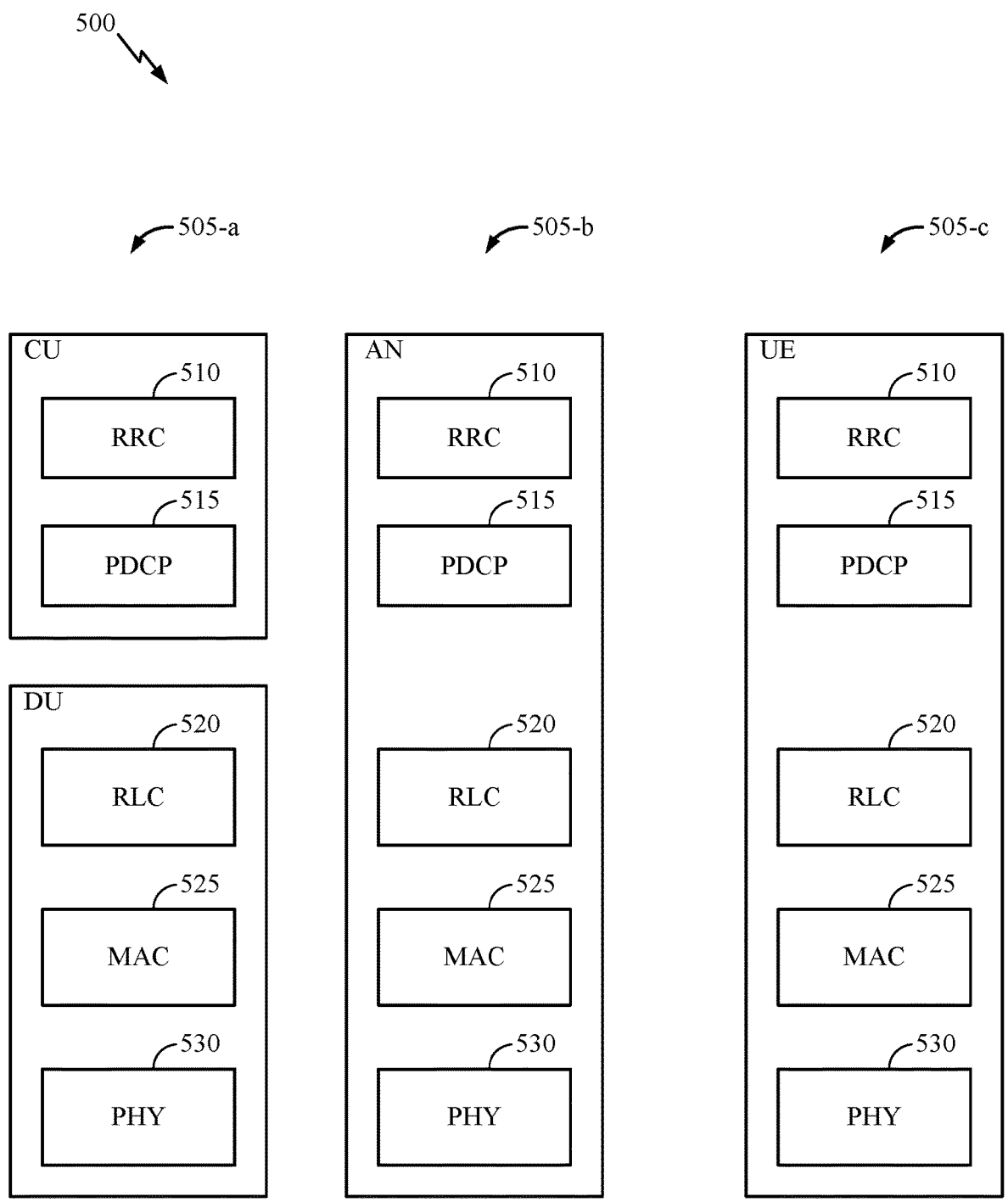
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack 505-c (e.g., the RRC layer 510, the PDCP layer 515, the RLC layer 520, the MAC layer 525, and the PHY layer 530).

Figure 6:
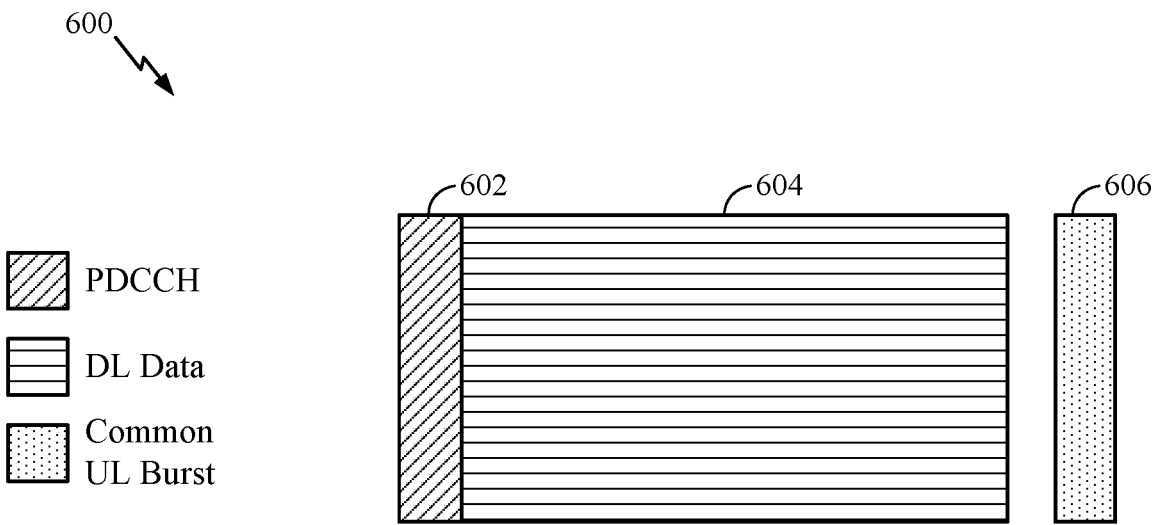
FIG. 6 illustrates an example of a downlink-centric (DL-centric) subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
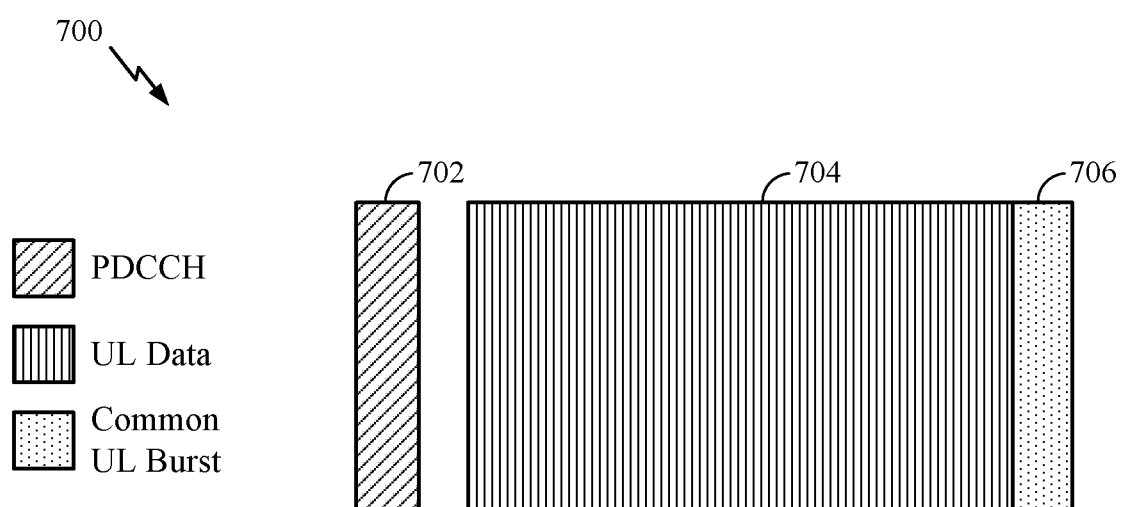
FIG. 7 illustrates an example of an uplink-centric (UL-centric) subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

ORTHOGONAL COVER CODE (OCC) SEQUENCES DESIGN FOR LONG PHYSICAL UPLINK CONTROL CHANNEL (PUCCH) TRANSMISSIONS

The present disclosure relates generally to wireless communication systems, and more particularly, to a design for generating and utilizing orthogonal cover code (OCC) sequences for physical uplink control channel (PUCCH) transmissions. The OCC sequences described herein may help address certain shortcoming in existing OCC sequence designs.

For example, in NR release 15, discrete Fourier transform (DFT) sequences are used as OCC sequences for PUCCH format 4 (i.e., long PUCCH with more than 2 bits and with UE multiplexing capacity 2 or 4). FIG. 8 is a table 800 of the previously known OCC sequences when user multiplexing capacity is 4. Indices of the OCC sequences are shown in the column 802, while the OCC sequences are in the column 804. The sequence having index 0 is shown at 810; similarly, the sequences with indices 1, 2, and 3 are shown at 812, 814, and 816. One problem with the previously known DFT sequences is that performance suffers for certain modulation schemes. For example, when the previously known DFT sequences are combined with a pi/2 binary phase shift keying (pi/2-BPSK) modulated signal, application of Sequence 0 or Sequence 2 will destroy the phase continuity of the pi/2-BPSK signal, thus increasing the peak to average power ratio (PAPR) of the signal.

Figure 9:
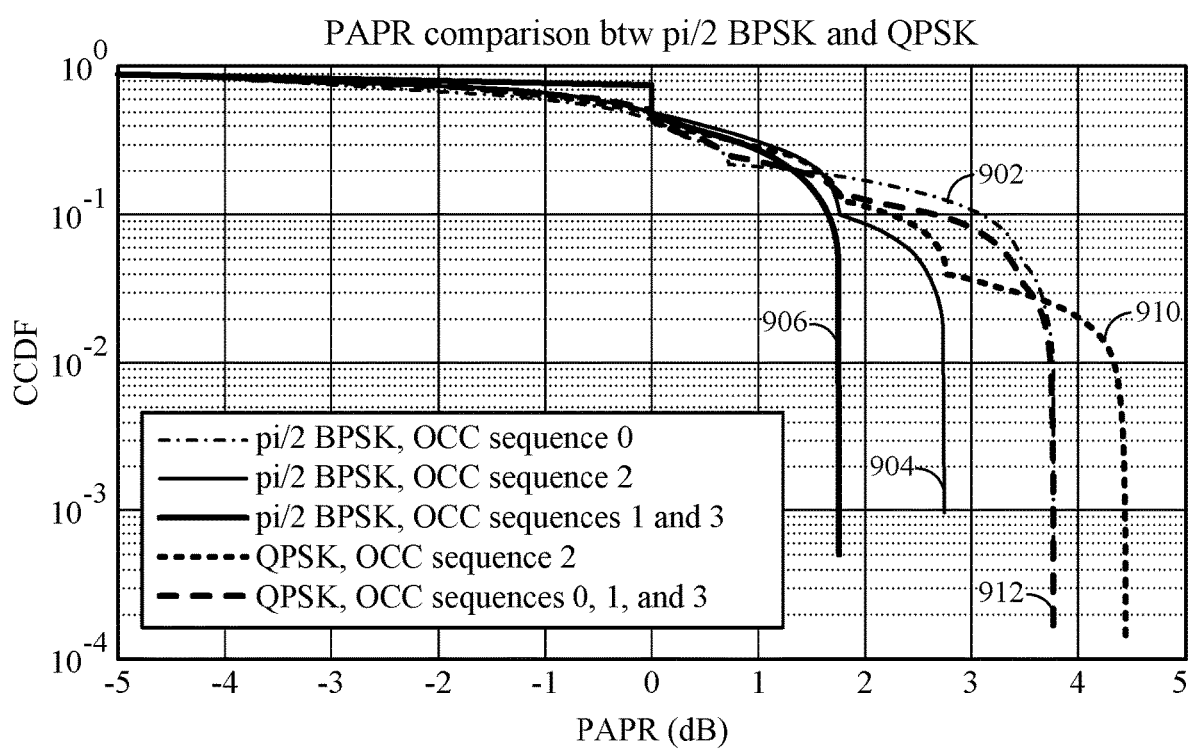
FIG. 9 illustrates example peak to average power ratio (PAPR) corresponding to the OCCs shown in FIG. 8.

FIG. 9 is a graph 900 of the PAPR of signals transmitted using the previously known DFT sequences with pi/2-BPSK modulation and with QPSK modulation. As illustrated, the maximum PAPR of a pi/2-BPSK signal transmitted with Sequence 0, as shown in curve 902, is 1 dB larger than the maximum PAPR of a pi/2-BPSK signal transmitted with Sequence 2, as shown in curve 904, and is 2 dB larger than the maximum PAPR of a pi/2-BPSK signal transmitted with Sequence 1 or with Sequence 3, as shown in curve 906. Similarly, the maximum PAPR of a quadrature phase shift keying (QPSK) signal transmitted with Sequence 2, as shown in curve 910, is approximately 0.7 dB larger than the maximum PAPR of a QPSK signal transmitted with any of the other sequences (i.e., sequences 0, 1, and 3), as shown in curve 912. It is undesirable for the maximum PAPR of transmissions to be increased due to the OCC sequences used with those transmissions.

Aspects of the present disclosure propose a set of OCC sequences that reduce the PAPR of transmissions, as compared with previously known OCC sequences, and at the same time may still enjoy all the other desired properties of the DFT sequences, such as frequency orthogonality.

Figure 10:
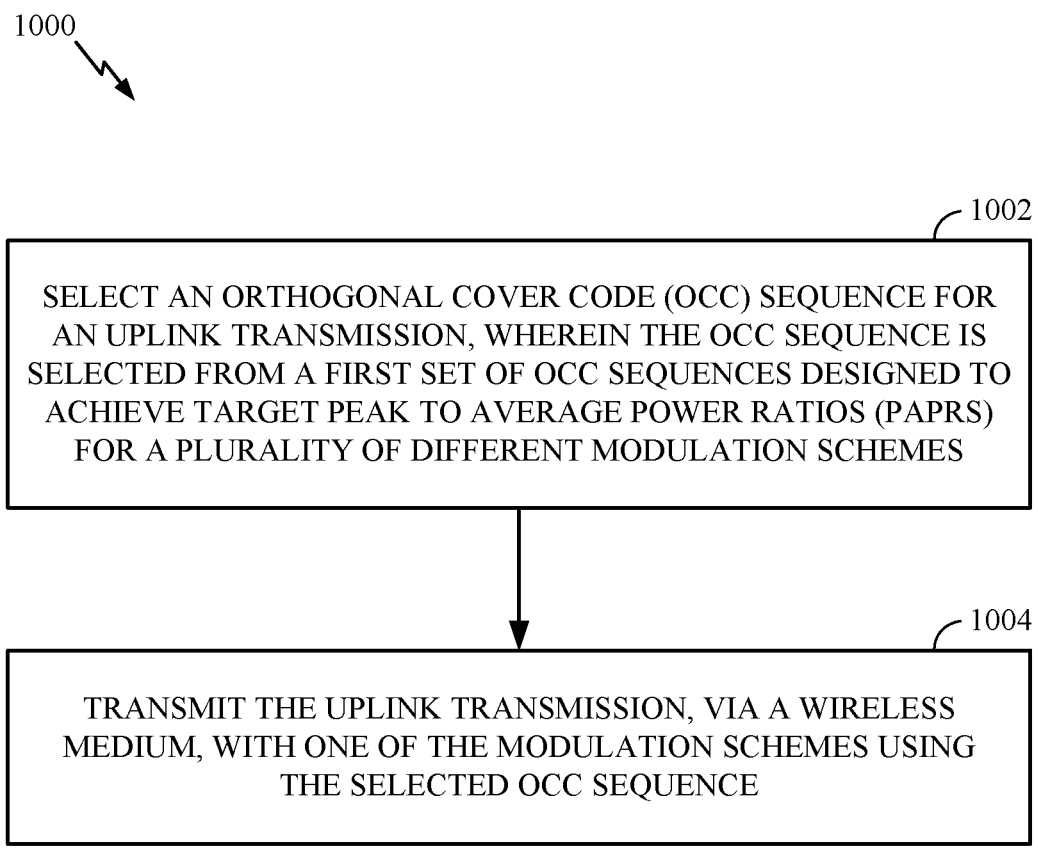
FIG. 10 illustrates example operations for wireless communications by a user equipment (UE), in accordance with certain aspects of the present disclosure.

FIG. 10 illustrates example operations 1000 for wireless communications by a UE using OCC sequences, in accordance with certain aspects of the present disclosure. Operations 1000 may be performed, for example, by UE 120 of FIG. 1 to send a PUCCH transmission, which may be multiplexed with PUCCH transmissions from other UEs 120 shown in FIG. 1.

Operations 1000 begin, at block 1002, by the UE selecting an orthogonal cover code (OCC) sequence for an uplink transmission, wherein the OCC sequence is selected from a first set of OCC sequences designed to achieve target peak to average power ratios (PAPRs) for a plurality of different modulation schemes. For example, UE 120 (shown in FIG. 1) selects an OCC sequence for a PUCCH transmission to BS 110a (see FIG. 1), wherein the OCC sequence is selected from a first set of OCC sequences (i.e., one of the sequences illustrated in FIG. 11) designed to achieve target PAPRs for a plurality of different modulation schemes (e.g., pi/2-BPSK and quadrature phase shift keying (QPSK)).

At block 1004, operations 1000 continue with the UE transmitting the uplink transmission, via a wireless medium, with one of the modulation schemes using the selected OCC sequence. Continuing the example from above, the UE 120 transmits the PUCCH (i.e., the PUCCH from block 1002) with one of the modulation schemes (from the plurality of different modulation schemes mentioned in block 1002, e.g., i/2-BPSK) using the selected OCC sequence (i.e., the OCC sequence selected in block 1002).

Figure 11:
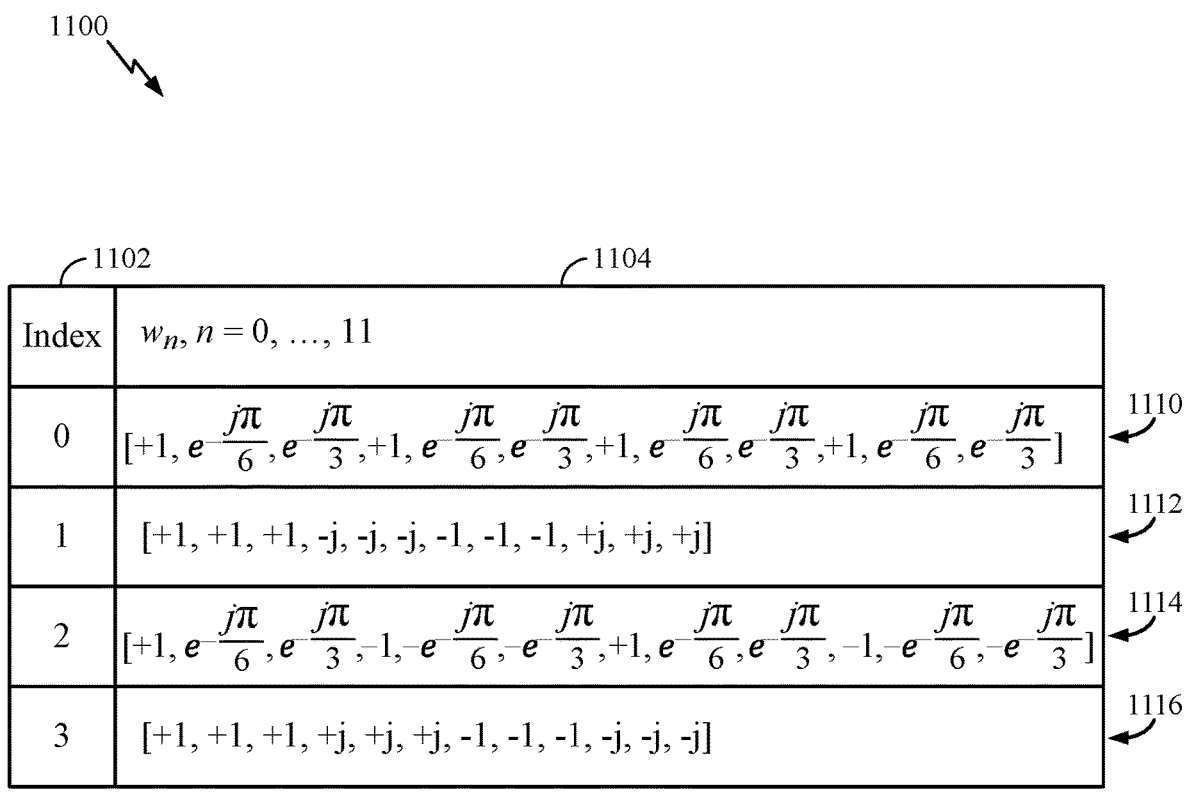
FIG. 11 illustrates example orthogonal cover code (OCC) sequences, in accordance with certain aspects of the present disclosure.

FIG. 11 shows a set 1100 of OCC sequences for an uplink transmission (e.g., a PUCCH Format 4 transmission) when UE multiplexing capacity is 4, in accordance with certain aspects of the present disclosure. Indices of the OCC sequences are shown in the column 1102, while the OCC sequences are in the column 1104. The sequence having index 0 is shown at 1110; similarly, the sequences with indices 1, 2, and 3 are shown at 1112, 1114, and 1116. This set of OCC sequences can be applied to all modulation orders, and is not limited to pi/2-BPSK modulation. As illustrated, Sequence 1, shown at 1112, may be identical to the previously known Sequence 1, shown at 812 of FIG. 8. Sequence 3, shown at 1116, may also be identical to the previously known Sequence 3, shown at 816 of FIG. 8, while Sequences 0 and 2, at 1110 and 1114, may be different from the previously known Sequences 0 and 2, shown at 810 and 814 of FIG. 8.

OCC sequences in the present disclosure may have various properties. For example, with the presently disclosed OCC sequences, the signals from 4 UEs may occupy orthogonal subcarriers in the frequency domain in a comb fashion (subcarrier starting index is 0) within a same resource block (RB), such that:

an uplink transmission by a UE using OCC sequence 0 occupies subcarriers 0, 4, and 8;
an uplink transmission by a UE using OCC sequence 1 occupies subcarriers 3, 7, and 11;
an uplink transmission by a UE using OCC sequence 2 occupies subcarriers 2, 6, and 10; and
an uplink transmission by a UE using OCC sequence 3 occupies subcarriers 1, 5, and 9.

Thus, signals (e.g., PUCCH signals) from 4 UEs may be multiplexed together in a single RB. Transmissions using the 4 OCC sequences may achieve a target PAPR. For example, the maximum PAPR of the OCC sequences of the present disclosure may be low, e.g., 1.7 dB for pi/2-BPSK modulated signals, compared with a 3.7 dB maximum PAPR for pi/2-BPSK modulated signals using the OCC sequences shown in FIG. 8. In another example, the maximum PAPR of QPSK modulated signals using the OCC sequences of the present disclosure may be 3.7 dB, while the maximum PAPR of QPSK modulated signals using the OCC sequences shown in FIG. 8 is 4.4 dB. Thus, the maximum PAPR of signals using the OCC sequences may be below a threshold value. Another property of the OCC sequences of the present disclosure is that the PAPR of a transmission using one of the disclosed OCC sequences is the same as the PAPR of the transmission using any of the other disclosed OCC sequences. For pi/2 BPSK modulated signals, the maximum PAPR of a transmission using one of the disclosed sequences is 1.7 dB, regardless of which sequence is used. Similarly, for QPSK modulated signals, the maximum PAPR of a transmission using one of the disclosed sequences is 3.7 dB, regardless of which sequence is used. In contrast, pi/2 BPSK and QPSK transmissions using the previously known sequences (shown in FIG. 8) have PAPRs that vary depending on which of the previously known sequences is used.

Figure 12:
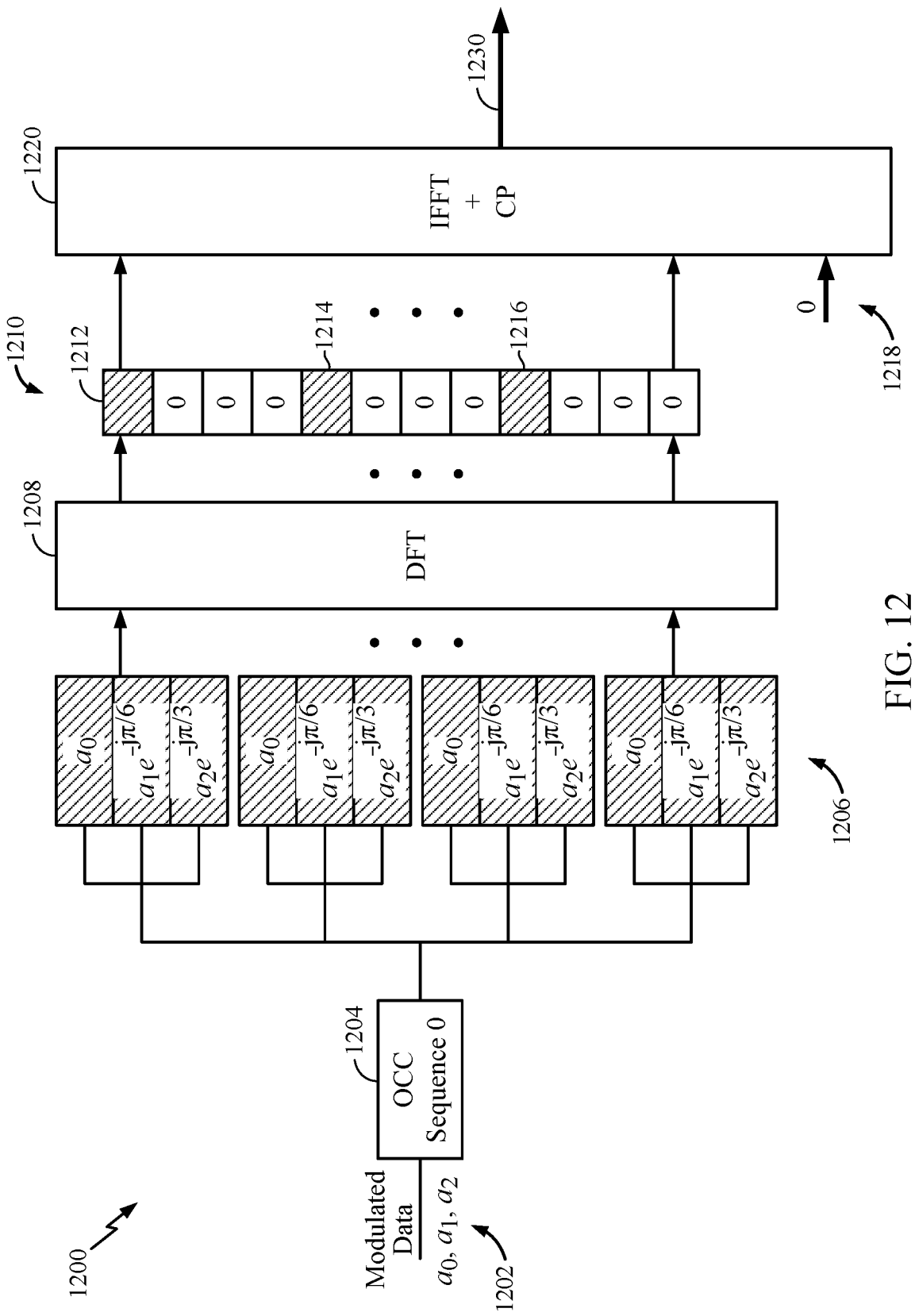
FIG. 12 illustrates a logical transmit process using one of the OCC sequences shown in FIG. 11.

FIG. 12 illustrates a logical transmit process 1200 using Sequence 0 of the OCC sequences shown in FIG. 11. As illustrated, the process 1200 begins with a sequence (also referred to herein as a group) of modulated data symbols (also referred to herein as modulated symbols) $a_0$, $a_1$, $a_2$, as shown at 1202. The sequence of modulated data symbols are modulated according to a selected modulation, such as pi/2 BPSK or QPSK. The sequence of modulated data symbols is repeated four times to form a group of intermediate symbols, each of which is multiplied by a corresponding value from Sequence 0 at 1204, producing a length-twelve signal, shown at 1206. The length-twelve signal may then have a length-twelve discrete Fourier transform, illustrated at 1208, performed, resulting in a second length-twelve signal, as shown at 1210. The second length-twelve signal includes nine zeroes and three non-zero values, shown at 1212, 1214, and 1216, according to aspects of the present disclosure. The second length-twelve signal may then be mapped to subcarriers, with, if necessary, additional zeroes (shown at 1218). The mapped values then have an inverse fast Fourier transform (IFFT) performed on them and a cyclic prefix (CP) is attached, at 1220, to generate an orthogonal frequency domain multiplexing (OFDM) symbol for transmission, at 1230. According to aspects of the present disclosure, performing a DFT, mapping to subcarriers, performing an IFFT, and attaching a CP may be referred to as discrete Fourier transform spread orthogonal frequency division multiplexing (DFT-s-OFDM) processing. As mentioned above, the process 1200 shown in FIG. 12 illustrates an example using disclosed OCC sequence 0, for disclosed OCC sequences 1, 2, and 3, the same processing flow will be used (i.e., applying the selected OCC sequence followed by DFT-s-OFDM processing), but the second length-twelve signal 1212 will have different non-zero locations (i.e., frequencies), depending on the selected OCC sequence.

Figure 13A:
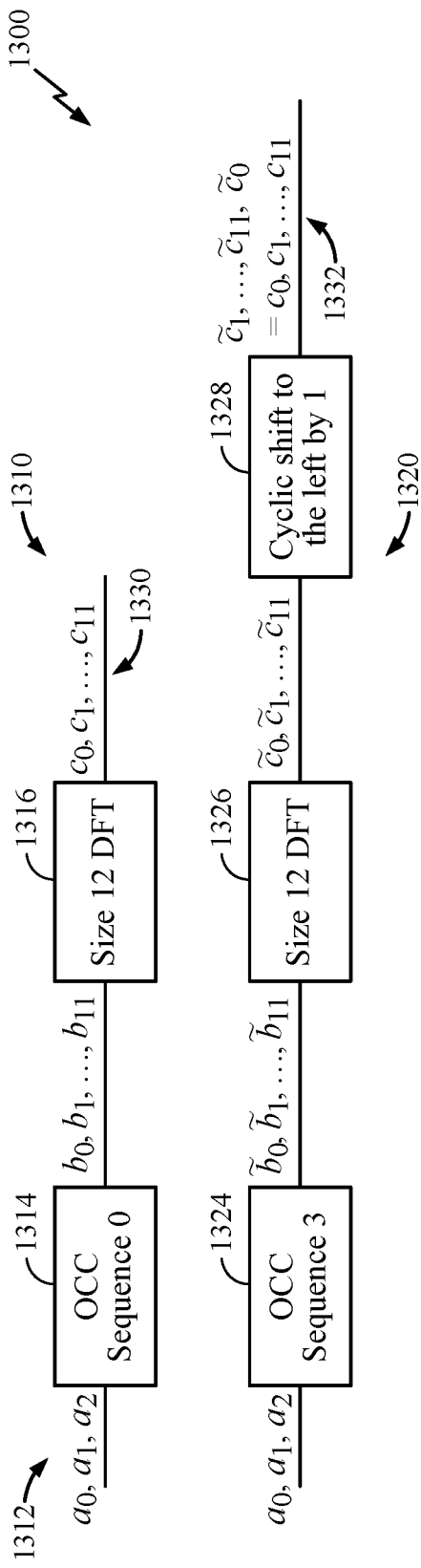
FIGS. 13A and 13B illustrate flow charts of options for implementing the OCC sequences shown in FIG. 11.

FIG. 13A is a flow chart 1300 for a process of transmitting with Sequence 0 (shown at 1110 in FIG. 11). As illustrated at 1310, transmitting with Sequence 0 may be accomplished by directly applying Sequence 0, at 1314, to the group of modulated symbols 1312 to generate a group of intermediate symbols before applying a DFT 1316, as shown, or by first applying Sequence 3 (shown at 1116 in FIG. 11) to the group of modulated symbols 1312 at 1324 to generate a group of intermediate symbols and then, after applying a DFT to the group of intermediate symbols at 1326, performing a cyclic shift on the group of intermediate symbols at 1328 to form a group of shifted intermediate symbols. In other words, the two implementations shown in FIG. 13A result in the same output signals 1330 and 1332.

Figure 13B:
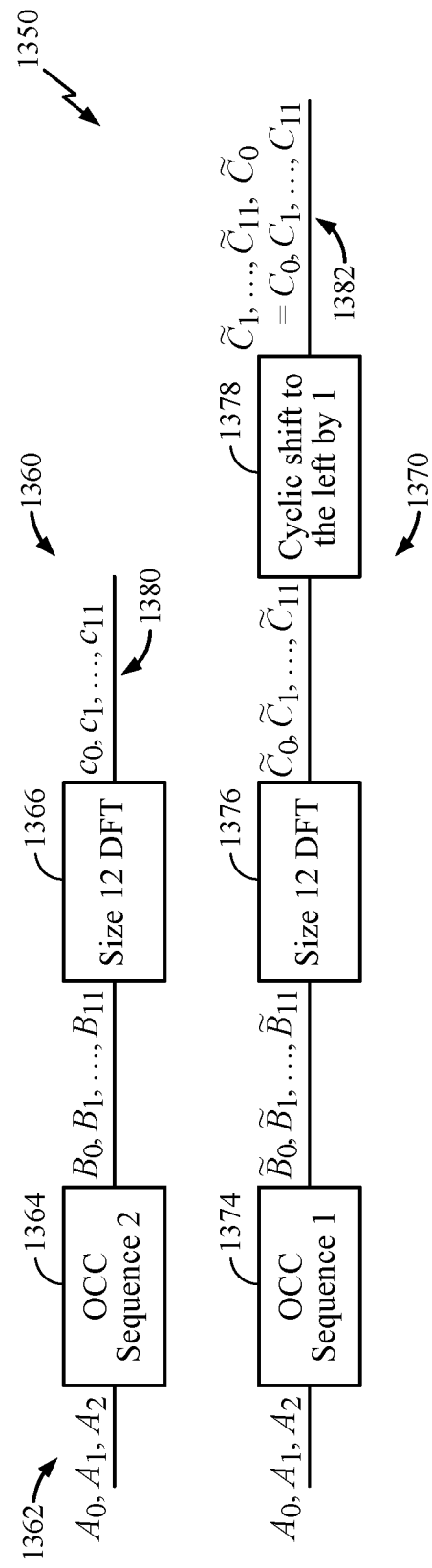

FIG. 13B is a similar flow chart 1350 for a process of transmitting with Sequence 2 (shown at 1114 in FIG. 11). As illustrated at 1360, transmitting with Sequence 2 may be accomplished by directly applying Sequence 2, at 1364, to the group of modulated values 1362 before applying a DFT 1366, as shown at 1360, or by first applying Sequence 1 (shown at 1112 in FIG. 11) to the group of modulated values 1362 at 1374 to generate a group of intermediate symbols and then, after applying a DFT to the group of intermediate symbols at 1376, applying a cyclic shift on the group of intermediate symbols to form a group of shifted intermediate symbols at 1378. In other words, the two implementations shown in FIG. 13B result in the same output signals 1380 and 1382.

Figure 14:
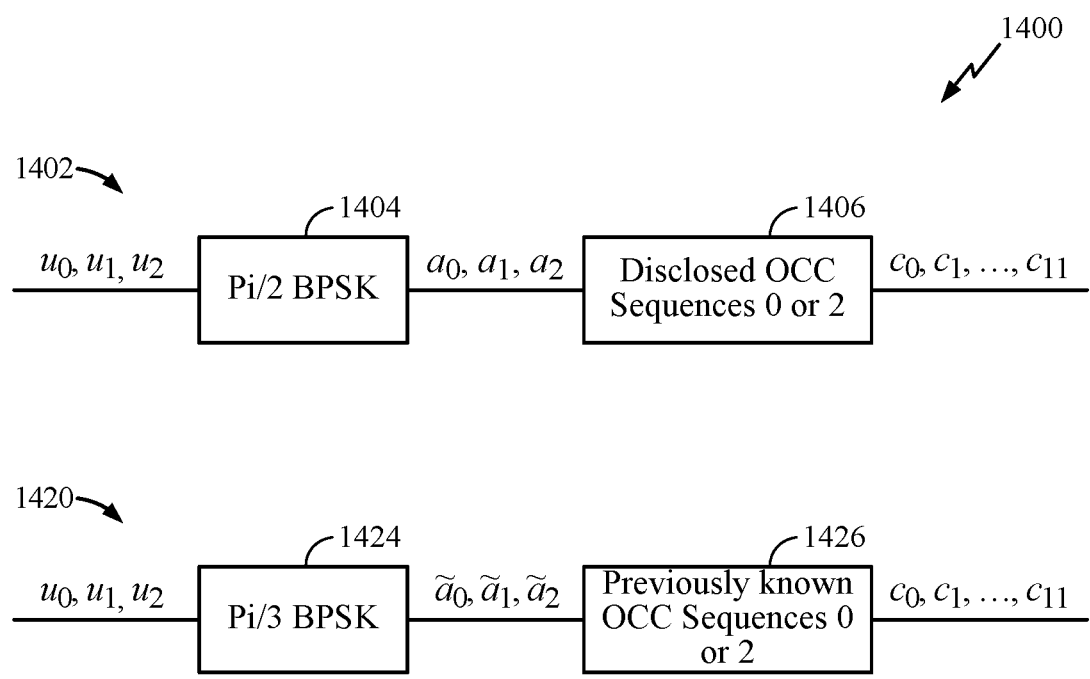
FIG. 14 illustrates an example comparison of implementations utilizing the OCC sequences shown in FIGS. 8 and 11, in accordance with certain aspects of the present disclosure.

FIG. 14 shows a flow chart 1400 for applying disclosed OCC sequences 0 or 2 to data and a flow chart 1420 for applying previously known OCC sequences 0 or 2 to the same data. As illustrated, the combination of applying a pi/2-BPSK modulation 1404 to data 1402 with applying the disclosed OCC sequences 0 or 2 from FIG. 11 at 1406 may be equivalent to the combination of applying a pi/3 BPSK modulation 1424 to data 1402 with the previously known DFT sequences 0 or 2 from FIG. 8. In other words, the two implementations shown in FIG. 14 can be used to generate equivalent signals from equivalent input data. The equivalence between the two combinations is demonstrated below:

In the flow chart 1400:

$$a_n = (e^{jn\pi/2})/(\sqrt{2})[(1-2u_n)+j(1-2u_n)], n=0,1,2;$$

after four repetitions, the signal becomes $b_k = a_{k_{mod\ 3}}$, k=0, ..., 11, where "mod 3" denotes the modulo 3 operation;

the disclosed OCC sequence 0 is [+1, $e^{(-j\pi/6)}$, $e^{(-j\pi/3)}$, +1, $e^{(-j\pi/6)}$, $e^{(-j\pi/3)}$, +1, $e^{(-j\pi/6)}$, $e^{(-j\pi/3)}$, +1, $e^{(-j\pi/6)}$, $e^{(-j\pi/3)}$]; and the signal after applying disclosed OCC sequence 0 is $c_k = b_k \cdot e^{-j\pi/6 \cdot (k\ mod\ 3)} = a_{k_{mod\ 3}} \cdot e^{-j\pi/6 \cdot (k\ mod\ 3)}$, k=0, ..., 11.

In the flow chart 1420:

$$\tilde{a}_n = (e^{jn\pi/3})/(\sqrt{2})[(1-2u_n)+j(1-2u_n)], n=0,1,2;$$

after four repetitions, the signal becomes $\tilde{b}_k = \tilde{a}_{k_{mod\ 3}}$, k=0, ..., 11, where "mod 3" again denotes the modulo 3 operation;

the previously known OCC sequence 0 is [+1, +1, +1, +1, +1, +1, +1, +1, +1, +1, +1, +1]; and the signal after applying previously known OCC sequence 0 is $c_k = \tilde{b}_k = \tilde{a}_{k_{mod\ 3}}$, k=0, ..., 11.

The equivalence between the combination of pi/2 BPSK with disclosed sequence 2 and the combination of pi/3 BPSK with previously known sequence 2 may be similarly demonstrated.

Figure 15:
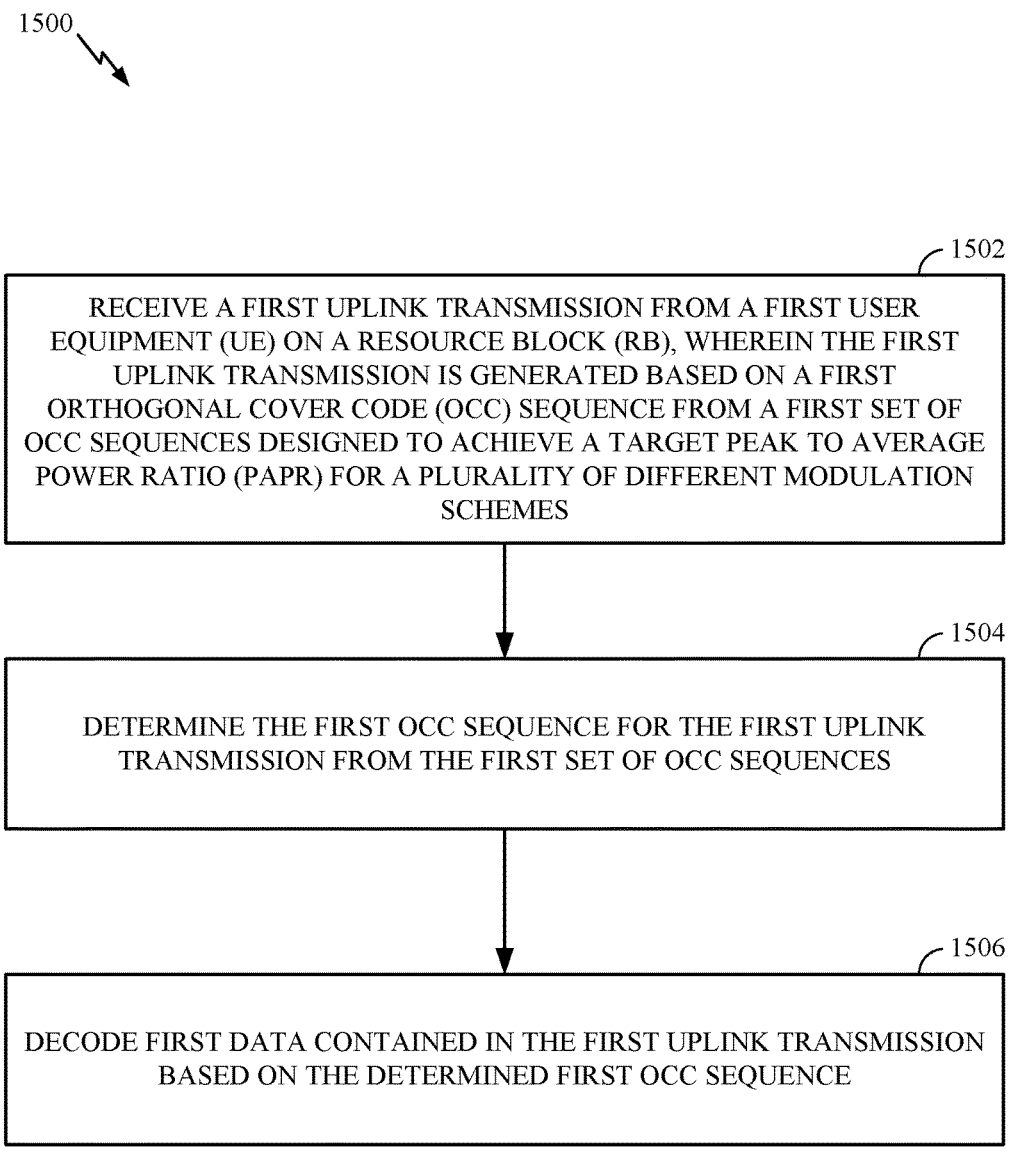
FIG. 15 illustrates example operations for wireless communications by a base station (BS), in accordance with certain aspects of the present disclosure.

FIG. 15 illustrates example operations 1500 for wireless communications by a base station (BS) using OCC sequences, in accordance with certain aspects of the present disclosure. Operations 1500 may be performed, for example, by BS 110a of FIG. 1 to receive a PUCCH transmission from UE 120, which may be multiplexed with PUCCH transmissions from other UEs 120 shown in FIG. 1. Operations 1500 may be considered complementary to operations 1000, shown in FIG. 10, above.

Operations 1500 begin, at block 1502, by the BS receiving a first uplink transmission from a first user equipment (UE) on a resource block (RB), wherein the first uplink transmission is generated based on a first orthogonal cover code (OCC) sequence from a first set of OCC sequences designed to achieve target peak to average power ratios (PAPRs) for a plurality of different modulation schemes. For example, BS 110a (shown in FIG. 1) receives a first uplink transmission (e.g., a PUCCH) from UE 120 (see FIG. 1) on a resource block (RB), wherein the first uplink transmission is generated based on a first OCC sequence from a first set of OCC sequences (i.e., one of the sequences illustrated in FIG. 11) designed to achieve target PAPRs for a plurality of different modulation schemes (e.g., pi/2-BPSK and quadrature phase shift keying (QPSK)).

At block 1504, operations 1500 continue with the BS determining the first OCC sequence for t the first uplink transmission from the first set of OCC sequences. Continuing the example from above, the BS 110a determines the first OCC sequence (i.e., the first OCC sequence mentioned in block 1502) for the first uplink transmission (i.e., the first uplink transmission received in block 1502) from the first set of OCC sequences (i.e., the set of OCC sequences mentioned in block 1502).

Operations 1500 continue at block 1506 with the BS decoding first data contained in the first uplink transmission based on the determined first OCC sequence. Continuing the example from above, the BS 110a decodes first data in the first uplink transmission (i.e., the first uplink transmission received in block 1502) based on the OCC sequence determined in block 1504.

According to aspects of the present disclosure, a BS may determine an OCC sequence (e.g., one of the sequences shown in FIG. 11) for an uplink transmission based on an assignment (e.g., via radio resource control (RRC) signaling) of the OCC sequence to a UE, a set of transmission resources in which the uplink transmission is received, and an assignment of the transmission resources to the UE.

In aspects of the present disclosure, receiving the uplink transmission comprises first identifying first subcarriers in the RB that contain the uplink transmission based on the first OCC sequence used in generating the uplink transmission, then setting a signal on other subcarriers in the RB to zero, then performing an inverse discrete Fourier transform (IDFT) on samples of the first sub carriers to determine signal values, and then dividing each of the signal values by a corresponding value from the determined first OCC sequence.

According to aspects of the present disclosure, receiving the uplink transmission using the determined first OCC sequence comprises first identifying first subcarriers in the RB that contain the uplink transmission based on the first OCC sequence used in generating the uplink transmission, then setting a signal on other subcarriers in the RB to zero, then applying a cyclic shift to samples of the first subcarriers, then performing an inverse discrete Fourier transform (IDFT) on the samples to determine intermediate values, and then dividing each intermediate value by a corresponding value of the determined OCC sequence.

In aspects of the present disclosure, receiving the uplink transmission using the first set of OCC sequences and a first modulation scheme is equivalent to receiving the uplink transmission using a second set of OCC sequences and a second modulation scheme.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for obtaining, means for designating, means for aggregating, means for collecting, means for selecting, means for switching, and means for detecting may comprise one or more processors, such as the controller/processor 480, transmit processor 464, receive processor 458, and/or MIMO processor 466 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   selecting an orthogonal cover code (OCC) sequence for an uplink transmission comprising a physical uplink control channel (PUCCH) format 4 transmission, wherein the OCC sequence is selected from a first set of OCC sequences designed to achieve target peak to average power ratios (PAPRs) for a plurality of different modulation schemes and allow multiplexed transmissions from a plurality of UEs comprising the UE and three other UEs within a same resource block (RB); and
   transmitting the uplink transmission, via a wireless medium, with one of the modulation schemes using the selected OCC sequence.

2. The method of claim 1, wherein the uplink transmission comprises a physical uplink control channel (PUCCH).

3. The method of claim 1, wherein the first set of OCC sequences is designed such that a maximum PAPR achieved for each sequence is below a threshold value.

4. The method of claim 1, wherein the first set of OCC sequences is designed such that a maximum PAPR achieved for an OCC sequence in the first set is equal to a maximum PAPR for any other OCC sequence in the first set.

5. The method of claim 1, wherein the PUCCH format 4 transmission and PUCCH signals from the three other UEs occupy orthogonal subcarriers in a frequency domain within the same RB.

6. The method of claim 1, wherein transmitting the uplink transmission comprises:
applying the selected OCC sequence to a group of modulated symbols to generate a group of intermediate symbols; and
performing discrete Fourier transform spread orthogonal frequency division multiplexing (DFT-s-OFDM) processing on the group of intermediate symbols.

7. The method of claim 1, wherein transmitting the uplink transmission using the selected OCC sequence comprises:
applying a selected second OCC sequence in the set of OCC sequences to a group of modulated symbols to generate a group of intermediate symbols;
performing a discrete Fourier transform (DFT) on the group of intermediate symbols;
applying a cyclic shift to the group of intermediate symbols subsequent to performing the DFT; and
applying orthogonal frequency division multiplexing (OFDM) processing on the group of shifted intermediate symbols.

8. The method of claim 1, wherein:
transmitting the uplink transmission using the first set of OCC sequences and a first modulation scheme is equivalent to transmitting the uplink transmission using a second set of OCC sequences and a second modulation scheme.

9. The method of claim 1, wherein the first set of OCC sequences comprises:
a first sequence $[+1, e^{\hat{}}(-j\pi/6), e^{\hat{}}(-j\pi/3), +1, e^{\hat{}}(-j\pi/6), e^{\hat{}}(-j\pi/3), +1, e^{\hat{}}(-j\pi/6), e^{\hat{}}(-j\pi/3), +1, e^{\hat{}}(-j\pi/6), e^{\hat{}}(-j\pi/3)]$;
a second sequence $[+1, +1, +1, -j, -j, -j, -1, -1, -1, +j, +j, +j]$;
a third sequence $[+1, e^{\hat{}}(-j\pi/6), e^{\hat{}}(-j\pi/3), -1, -e^{\hat{}}(-j\pi/6), -e^{\hat{}}(-j\pi/3), +1, e^{\hat{}}(-j\pi/6), e^{\hat{}}(-j\pi/3), -1, -e^{\hat{}}(-j\pi/6), -e^{\hat{}}(-j\pi/3)]$; and
a fourth sequence $[+1, +1, +1, +j, +j, +j, -1, -1, -1, -j, -j, -j]$.

10. A method for wireless communications by a base station (BS), comprising:
receiving a first uplink transmission comprising a physical uplink control channel (PUCCH) format 4 transmission from a first user equipment (UE) on a resource block (RB), wherein the first uplink transmission is generated based on a first orthogonal cover code (OCC) sequence from a first set of OCC sequences designed to achieve a target peak to average power ratio (PAPR) for a plurality of different modulation schemes and allow multiplexed transmissions from a plurality of UEs comprising four UEs within the RB;
determining the first OCC sequence for the first uplink transmission from the first set of OCC sequences; and
decoding first data contained in the first uplink transmission based on the determined first OCC sequence.

11. The method of claim 10, wherein the first uplink transmission comprises a physical uplink control channel (PUCCH).

12. The method of claim 10, wherein the first set of OCC sequences is designed such that a maximum PAPR achieved for each sequence is below a threshold value.

13. The method of claim 10, wherein the PUCCH format 4 transmission and second uplink transmissions from three of the four UEs occupy orthogonal subcarriers in a frequency domain within the RB, and the method further comprises:
receiving the second uplink transmissions on the RB;
determining a second OCC sequence from the first set of OCC sequences, for each of the second uplink transmissions; and
decoding second data contained in each of the second uplink transmissions based on the corresponding determined second OCC sequence.

14. The method of claim 10, wherein receiving the first uplink transmission comprises:
first identifying first subcarriers in the RB that contain the first uplink transmission based on the first OCC sequence,
then setting a signal on other subcarriers in the RB to zero,
then performing an inverse discrete Fourier transform (IDFT) on samples of the first subcarriers to determine signal values, and
then dividing each of the signal values by a corresponding value from the determined first OCC sequence.

15. The method of claim 10, wherein receiving the first uplink transmission using the determined first OCC sequence comprises:
first identifying first subcarriers in the RB that contain the first uplink transmission based on the first OCC sequence,
then setting a signal on other subcarriers in the RB to zero,
then applying a cyclic shift to samples of the first subcarriers,
then performing an inverse discrete Fourier transform (IDFT) on the samples to determine intermediate values, and
then dividing each intermediate value by a corresponding value of a second OCC sequence from the set of OCC sequences.

16. The method of claim 10, wherein:
receiving the first uplink transmission using the first set of OCC sequences and a first modulation scheme is equivalent to receiving the first uplink transmission using a second set of OCC sequences and a second modulation scheme.

17. The method of claim 10, wherein the first set of OCC sequences comprises:
a first sequence $[+1, e^{\hat{}}(-j\pi/6), e^{\hat{}}(-j\pi/3), +1, e^{\hat{}}(-j\pi/6), e^{\hat{}}(-j\pi/3), +1, e^{\hat{}}(-j\pi/6), e^{\hat{}}(-j\pi/3), +1, e^{\hat{}}(-\pi/6), e^{\hat{}}(-j\pi/3)]$;
a second sequence $[+1, +1, +1, -j, -j, -j, -1, -1, -1, +j, +j, +j]$;
a third sequence $[+1, e^{\hat{}}(-j\pi/6), e^{\hat{}}(-j\pi/3), -1, -e^{\hat{}}(-j\pi/6), -e^{\hat{}}(-j\pi/3), +1, e^{\hat{}}(-j\pi/6), e^{\hat{}}(-j\pi/3), -1, -e^{\hat{}}(-j\pi/6), -e^{\hat{}}(-j\pi/3)]$; and
a fourth sequence $[+1, +1, +1, +j, +j, +j, -1, -1, -1, -j, -j, -j]$.

18. The method of claim 10, further comprising:
receiving a second uplink transmission from a second UE multiplexed with the first uplink transmission on the RB;
determining a second OCC sequence for the second uplink transmission from the first set of OCC sequences; and
decoding second data contained in the second uplink transmission based on the determined second OCC sequence.

19. An apparatus for wireless communications, comprising:
- a processor configured to:
- select an orthogonal cover code (OCC) sequence for an uplink transmission comprising a physical uplink control channel (PUCCH) format 4 transmission, wherein the OCC sequence is selected from a first set of OCC sequences designed to achieve target peak to average power ratios (PAPRs) for a plurality of different modulation schemes and allow multiplexed transmissions from the apparatus and a plurality of UEs comprising three other UEs within a same resource block (RB); and
- transmit the uplink transmission, via a wireless medium, with one of the modulation schemes using the selected OCC sequence; and
- a memory coupled with the processor.

20. The apparatus of claim 19, wherein the uplink transmission comprises a physical uplink control channel (PUCCH).

21. The apparatus of claim 19, wherein the first set of OCC sequences is designed such that a maximum PAPR achieved for each sequence is below a threshold value.

22. The apparatus of claim 19, wherein the first set of OCC sequences is designed such that a maximum PAPR achieved for an OCC sequence in the first set is equal to a maximum PAPR for any other OCC sequence in the first set.

23. The apparatus of claim 19, wherein the processor is configured to transmit the uplink transmission by:
- applying the selected OCC sequence to a group of modulated symbols to generate a group of intermediate symbols, and
- performing discrete Fourier transform spread orthogonal frequency division multiplexing (DFT-s-OFDM) processing on the group of intermediate symbols.

24. The apparatus of claim 19, wherein the processor is configured to transmit the uplink transmission using the selected OCC sequence by:
- applying a selected second OCC sequence in the set of OCC sequences to a group of modulated symbols to generate a group of intermediate symbols;
- performing a discrete Fourier transform (DFT) on the group of intermediate symbols;
- applying a cyclic shift to the group of intermediate symbols subsequent to performing the DFT; and
- applying orthogonal frequency division multiplexing (OFDM) processing on the group of shifted intermediate symbols.

25. The apparatus of claim 19, wherein:
transmitting the uplink transmission using the first set of OCC sequences and a first modulation scheme is equivalent to transmitting the uplink transmission using a second set of OCC sequences and a second modulation scheme.

26. The apparatus of claim 19, wherein the first set of OCC sequences comprises:
- a first sequence $[+1, e^{(-j\pi/6)}, e^{(-j\pi/3)}, +1, e^{(-j\pi/6)}, e^{(-j\pi/3)}, +1, e^{(-j\pi/6)}, e^{(-j\pi/3)}, +1, e^{(-j\pi/6)}, e^{(-j\pi/3)}]$;
- a second sequence $[+1, +1, +1, -j, -j, -j, -1, -1, -1, +j, +j, +j]$;
- a third sequence $[+1, e^{(-j\pi/6)}, e^{(-j\pi/3)}, -1, -e^{(-j\pi/6)}, -e^{(-j\pi/3)}, +1, e^{(-j\pi/6)}, e^{(-j\pi/3)}, -1, -e^{(-j\pi/6)}, -e^{(-j\pi/3)}]$; and
- a fourth sequence $[+1, +1, +1, +j, +j, +j, -1, -1, -1, -j, -j, -j]$.

27. An apparatus for wireless communications, comprising:
- a processor configured to:
- receive a first uplink transmission comprising a physical uplink control channel (PUCCH) format 4 transmission from a first user equipment (UE) on a resource block (RB), wherein the first uplink transmission is generated based on a first orthogonal cover code (OCC) sequence from a first set of OCC sequences designed to achieve a target peak to average power ratio (PAPR) for a plurality of different modulation schemes and allow multiplexed transmissions from a plurality of UEs comprising four UEs within the RB;
- determine the first OCC sequence for the first uplink transmission from the first set of OCC sequences; and
- decode first data contained in the first uplink transmission based on the determined first OCC sequence; and
- a memory coupled with the processor.

* * * * *